US008532631B2

United States Patent
Krishnamurthy et al.

(12) United States Patent
(10) Patent No.: US 8,532,631 B2
(45) Date of Patent: Sep. 10, 2013

(54) DEVICES, SYSTEMS AND METHODS FOR PROACTIVE CALL CONTEXT, CALL SCREENING AND PRIORITIZATION

(75) Inventors: Udhayakumar Krishnamurthy, Parlin, NJ (US); Rajan Anand, Edison, NJ (US); Basker Kothandam, South Amboy, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 462 days.

(21) Appl. No.: 12/336,526

(22) Filed: Dec. 16, 2008

(65) Prior Publication Data
US 2010/0151839 A1   Jun. 17, 2010

(51) Int. Cl.
*H04M 3/42*   (2006.01)
*H04M 1/64*   (2006.01)
*H04B 7/00*   (2006.01)

(52) U.S. Cl.
USPC ........ 455/414.1; 455/415; 455/512; 379/67.1

(58) Field of Classification Search
USPC ................... 455/567, 415, 412.1, 412.2, 413, 455/512; 379/418, 67.1
See application file for complete search history.

(56) References Cited

U.S. PATENT DOCUMENTS

| | | | | |
|---|---|---|---|---|
| 6,041,103 A | * | 3/2000 | La Porta et al. | 379/67.1 |
| 7,676,237 B2 | * | 3/2010 | Daigle | 455/512 |
| 2007/0072593 A1 | * | 3/2007 | Huliyapur Math | 455/415 |
| 2009/0311999 A1 | * | 12/2009 | Sarkar et al. | 455/415 |

* cited by examiner

*Primary Examiner* — Kent Chang
*Assistant Examiner* — Ngan Pham Lu
(74) *Attorney, Agent, or Firm* — Hartman & Citrin LLC (57) ABSTRACT

Devices, systems and methods are disclosed which enable a user of a communications device to receive a notification of a priority and a context of a call before answering the call. A caller records a short phrase to be played on the callee's device either in place of ringing or following a predetermined amount of rings controlled by the callee's preferences. Among the callee's preferences is a selection of priority, such as among low, high, and critical. When callee's communications device is in any of these modes, every incoming call is intercepted giving the caller the opportunity to provide a short phrase for the context of the call and choose a priority level. This short phrase is played on the callee's communications device if the specified priority of the call matches or exceeds the current mode set on the callee's communications device, and the callee may answer.

19 Claims, 5 Drawing Sheets

DEVICES, SYSTEMS AND METHODS FOR PROACTIVE CALL CONTEXT, CALL SCREENING AND PRIORITIZATION

BACKGROUND OF THE INVENTION

1. Field of the Invention

The present invention relates to communications devices. More specifically, the present invention relates to screening the context and priority of incoming calls.

2. Background of the Invention

The importance of incoming calls varies greatly. For instance, a wife calling her husband may be calling to inform him of a family emergency or simply to tell him to pick up milk from the grocery store on the way home. Unfortunately, a cellular telephone user has no way to distinguish between these types of calls. The user may unknowingly ignore a very important call due to being in a meeting or simply chatting with a friend.

Today, when a call comes in, all a telephone user knows is the originating phone number or name of the person to whom this number belongs. This provides no information about the nature, purpose, or the importance of the call, which makes it difficult for the telephone user to determine whether to pick up the call, especially when one is busy or preoccupied. This situation may lead a telephone user to either lose a call he would have otherwise picked up, or pick up a call he would have otherwise passed. When a telephone user ignores an incoming call for lack of context information, he or she is left speculating about the nature and importance of the call, causing emotional stress or costly consequences, such as missing critical business information in the middle of an investor meeting. Current telephone systems also leave the caller no way to provide context information for the call to prompt the telephone user to pick up. The only alternative available today is to send a text message to the device.

As telephones become more and more sophisticated, the caller identification system may seem awkwardly simple and underachieving. Cellular telephones come equipped with custom ringtones and vibration alerts. With this level of technology there needs to be a better way to alert a callee of the context and priority of a call before the callee answers the phone.

There is a need for a telephone or a system which allows a caller to input a brief context of the call being placed and a priority level of the call. There is also a need for a callee to be notified of this context and priority information in order to determine whether or not to answer the call before answering the call.

SUMMARY OF THE INVENTION

The present invention enables a user of a communications device to receive a notification of a priority and a context of a call before answering the call. A caller records a short phrase to be played on the callee's device either in place of ringing or following a predetermined amount of rings controlled by the callee's preferences. Among the callee's preferences is a selection of priority, such as among low, high, and critical. When callee's communications device is in any of these modes, every incoming call is intercepted giving the caller the opportunity to provide a short phrase for the context of the call and choose a priority level. This short phrase is played on the callee's communications device if the specified priority of the call matches or exceeds the current mode set on the callee's communications device, and the callee may answer. If the specified priority of the call falls below the current mode set, then the short phrase and priority are saved, but the call is ignored. Optional device configuration allows a special tone, vibration pattern, or beep to occur on the callee's communications device indicating a call has been ignored. The recorded phrase can then be reviewed on demand. The above solution can also be extended to provide a quick glimpse into the voicemail, either in place of the current tone indicating a voicemail has arrived, or immediately following.

In one exemplary embodiment, the present invention is a communications device for screening and prioritization. The communications device includes a processor, a transceiver in communication with the processor, a memory in communication with the processor, a notification logic on the memory, an audio output in communication with the processor, and a display in communication with the processor. The notification logic intercepts a call request including an audible message, and plays the message over the audio output before the call request is accepted.

In another exemplary embodiment, the present invention is a communications system for providing a priority and a context of a call. The communications system includes a notification server, a notification logic on the notification server, a first communications device in communication with the notification server, and a second communications device in communication with the notification server and the first communications device. The notification server intercepts a call request from the second communications device to the first communications device and notifies the first communications device of the context and the priority of the call before the call request is accepted.

In a further exemplary embodiment, the present invention is a method of providing a priority and a context of a call before the call is answered. The method includes intercepting a call request from an initiating communications device, recording a context and a priority of the call, forwarding the context and the priority of the call to a callee's communications device, and connecting the initiating communications device with the callee's communications device. A callee answers the call based on the priority and context of the call.

In yet another exemplary embodiment, the present invention is a method of providing a priority and a context of a call before the call is answered. The method includes receiving a context and a priority of a call, comparing the priority with a predetermined minimum priority, alerting a user of the context of the call, and answering the call. The user answers the call based on the priority and context of the call.

DETAILED DESCRIPTION OF THE INVENTION

The present invention enables a user of a communications device to receive a notification of a priority and a context of a call before answering the call. A caller records a short phrase to be played on the callee's device either in place of ringing or following a predetermined amount of rings controlled by the callee's preferences. Among the callee's preferences is a selection of priority, such as among low, high, and critical. When callee's communications device is in any of these modes, every incoming call is intercepted giving the caller the opportunity to provide a short phrase for the context of the call and choose a priority level. This short phrase is played on the callee's communications device if the specified priority of the call matches or exceeds the current mode set on the callee's communications device, and the callee may answer. If the specified priority of the call falls below the current mode set, then the short phrase and priority are saved, but the call is ignored. Optional device configuration allows a special tone, vibration pattern, or beep to occur on the callee's communications device indicating a call has been ignored. The recorded phrase can then be reviewed on demand. The above solution can also be extended to provide a quick glimpse into the voicemail, either in place of the current tone indicating a voicemail has arrived, or immediately following.

"Communications device," as used herein and throughout this disclosure, refers to a device capable of wired or wireless communication with another such device. Examples of a communications device include a cellular telephone, a landline telephone, a personal digital assistant (PDA), a computer, etc.

"Caller," as used herein and throughout this disclosure, refers to one who places a call in pursuit of communication. A caller can place a call by dialing a phone number, inputting an internet protocol (IP) address, etc.

"Callee," as used herein and throughout this disclosure, refers to one with whom communication is pursued through a call. A callee does not need to answer the call to be considered a callee.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Exemplary embodiments of the screening and prioritization system are wholly contained within the callee's communications device. In these embodiments, the caller places a call to a callee in the ordinary fashion. However, instead of reaching the callee, the communications device intercepts the call and queries the caller for priority and call context.

Figures 1A, 1B:
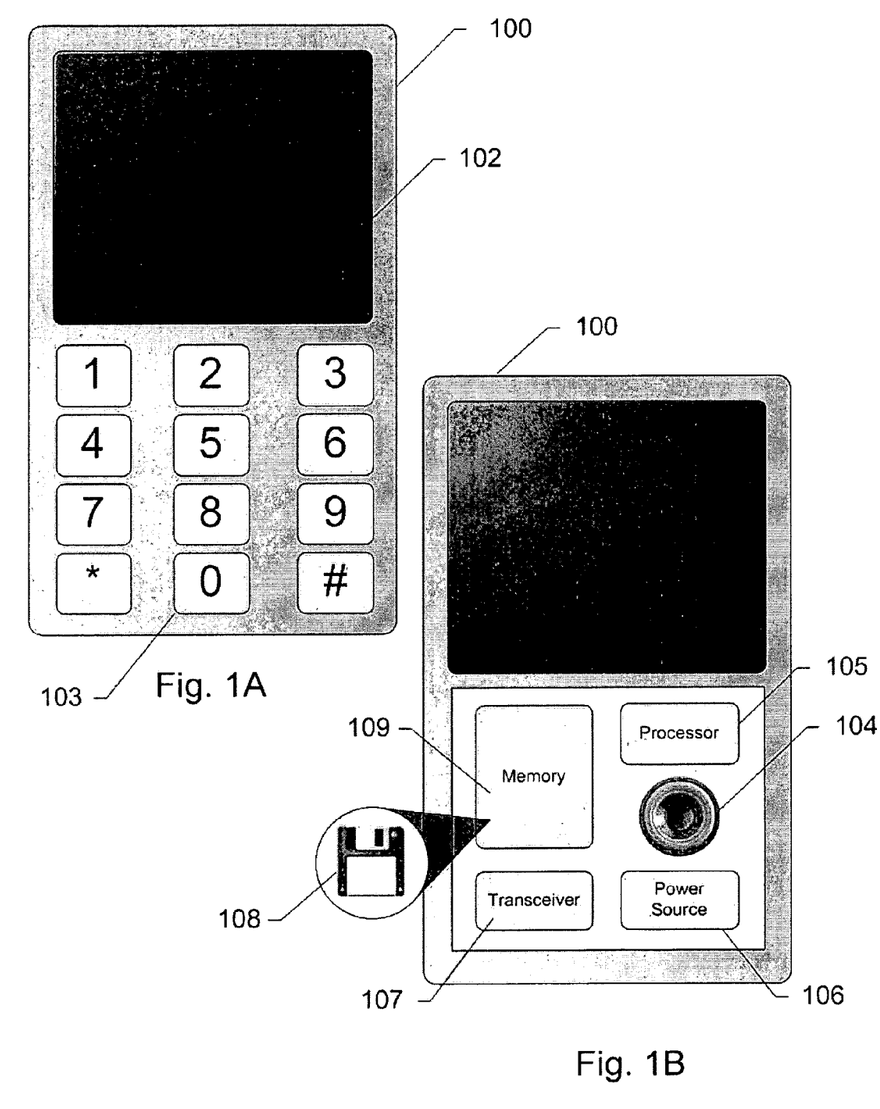
FIGS. 1A and 1B show a communications device for screening and prioritization, according to an exemplary embodiment of the present invention.

FIGS. 1A and 1B show a communications device 100 for screening and prioritization, according to an exemplary embodiment of the present invention. In this embodiment, communications device 100 includes a display 102, an input 103, a speaker 104, a processor 105, a power source 106, a transceiver 107, a memory 109, and a notification logic 108 on memory 109. Display 102 allows a callee to view incoming calls as well as their priority. This gives the callee the identification of the caller. Display 102 also allows callee to set a priority of calls which will ring through. Input 103 allows callee to answer incoming calls, dial numbers for outgoing calls, create text messages, etc. Input 103 also works in conjunction with display 102 to allow callee to set a priority of calls which will ring through. Speaker 104 plays a message from the caller to the callee to give the callee a context of the call. Speaker 104 also rings or plays ringtones when a call context has not been sent. Processor 105 executes programs stored on memory 109. Power source 106 provides power to all of the internal components of communications device 100. Transceiver 107 allows communications device to send and receive calls, data, etc. Transceiver 107 can communicate using cellular radio frequency (RF), BLUETOOTH, WIFI, voice over internet protocol (VoIP), plain old telephone service (POTS), etc. Notification logic 109 intercepts incoming calls from the caller. Notification logic 109 prompts the caller to set a priority and record or create a message. Notification logic 109, in concert with processor 105, routes the message through speaker 104 if the priority level set by callee is met.

The speaker is most likely an internal speaker, but headphones or other audio output systems may be used with compatible communications devices. The transceiver can use cellular RF, WIFI, BLUETOOTH, or any other wired or wireless transmission type. In other exemplary embodiments, the context of the call is asserted in the form of a text message instead of a recorded message. For these embodiments, the display is used to alert the callee of the call context as well as identify the caller. Other embodiments allow the caller to choose a mode of call context using voice, text, photo, video, etc. In further embodiments the communications device gives the caller notification of how busy the callee is. Some embodiments let the caller know before asking about the priority and context, while other embodiments let the caller know after asking about priority and context.

In exemplary embodiments where the communications device is a cellular telephone, onboard software, the notification logic, enables the screening and prioritization. The cellular telephone software receives the call as if the callee has answered even though the callee hasn't answered the call. The software makes an audible query to the caller to retrieve the priority and context of the call. The screening and prioritization is implemented by enhancing the software which is running on legacy cellular telephones.

In other exemplary embodiments, the screening and prioritization takes place on a notification server on a communications network. The caller has substantially the same experience as with the previous embodiments, but the interception takes place before it reaches the callee's communications device.

Figure 2:
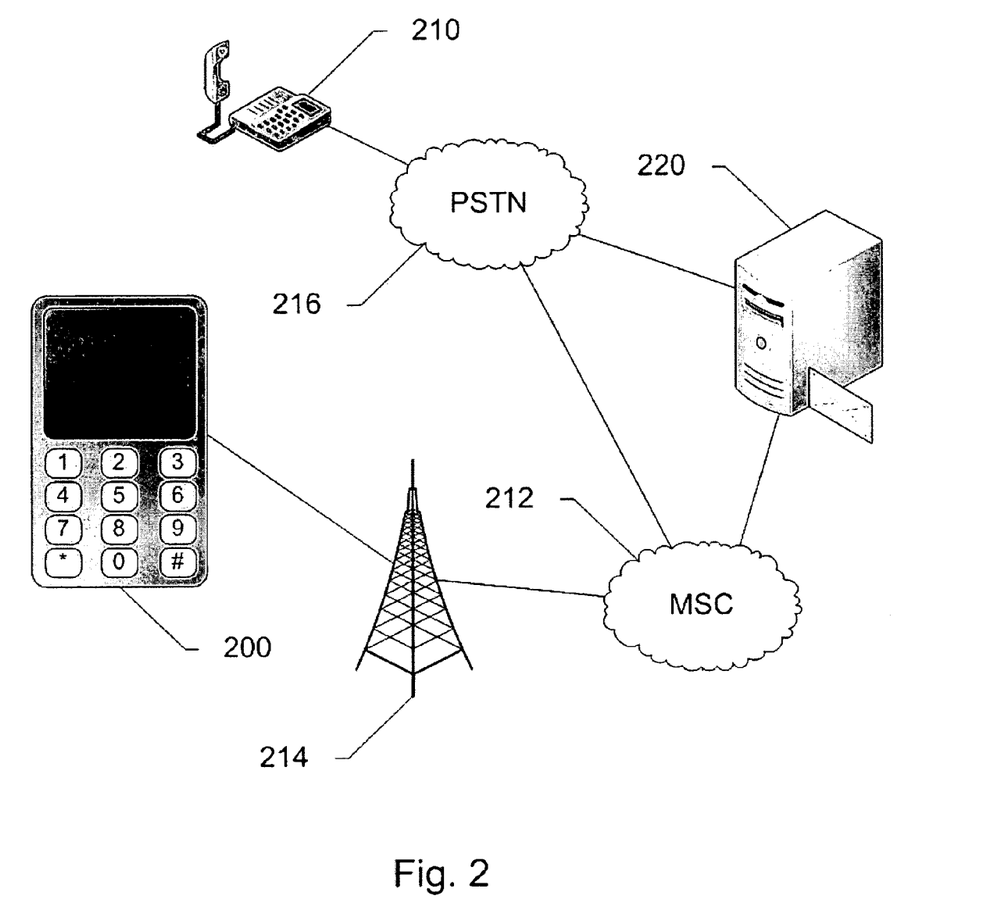
FIG. 2 shows a system for priority and context notification, according to an exemplary embodiment of the present invention.

FIG. 2 shows a system for priority and context notification, according to an exemplary embodiment of the present invention. In this embodiment, the system includes a communications device 200, a broadcast tower 214, a mobile switching center (MSC) 212, a notification server 220, a public switched telephone network (PSTN) 216, and a landline telephone 210. When a caller on landline telephone 210 places a call to callee on communications device 200, the call is routed through PSTN 216 and intercepted by notification server 220. Notification server 220 prompts the caller to set a priority level of the call. This priority level may have various settings, such as low, medium, and high; not very important and urgent; etc. Notification server 220 also prompts the caller to record or create a context of the call. This context may be in the form of a voice clip, a text message, etc. Notification server 220 routes the priority, context, and call through mobile switching center 212 and broadcast tower 214 to communications device 200. If the priority meets a threshold set by callee, then the context is played in place of a ringtone or after a first ring. The priority is displayed on the display of communications device 200. Callee uses the context and priority to decide whether to answer the call. If the priority does not meet the threshold, then the callee is notified of the call but not disturbed. If the callee prefers, a small beep, vibration, etc., can be used to alert the callee of the call.

In exemplary embodiments where a notification server contains the screening and prioritization software, any legacy cellular or landline telephone can be used. Callees may not be able to use their communications device to select preferences, but can call the notifications server to input preferences, such as with a voicemail system. Some legacy communications devices lack remote control of the ringtone. In exemplary embodiments with these communications devices, an audible recording of call context is played when the callee first answers the call, but before the caller is connected. The notification server plays the recording of call context then queries the callee for acceptance of the call. The callee inputs the decision through touch tones, voice recognition, etc.

Whether the screening and prioritization takes place on the callee's communications device or a notification server on the network, the process is substantially the same. The call is intercepted and the caller is queried before the callee even knows a call is being attempted. The first notice the callee receives of a call being attempted comes with the context and priority of the call.

Figure 3:
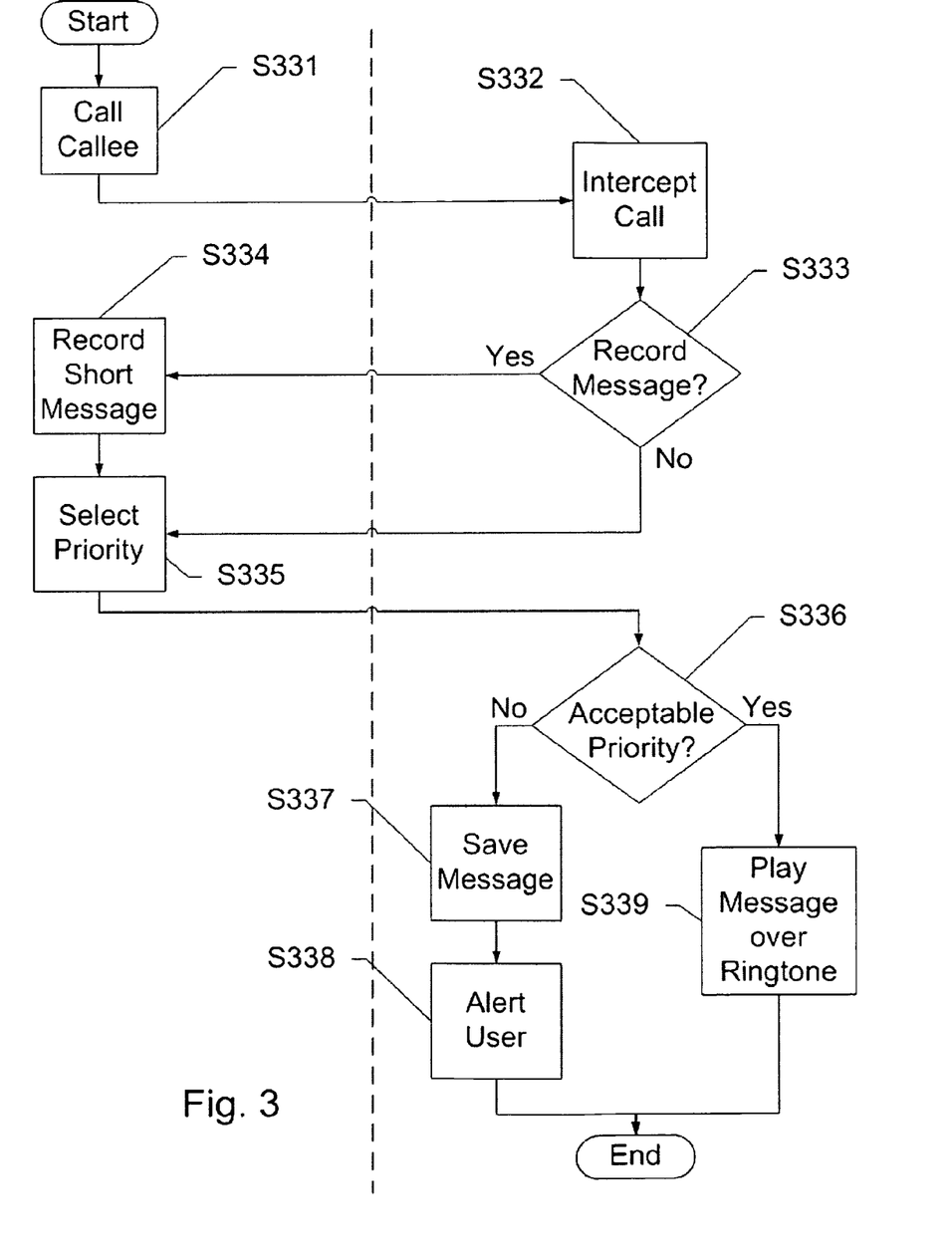
FIG. 3 shows a flowchart of a method of screening and prioritization, according to an exemplary embodiment of the present invention.

FIG. 3 shows a flowchart of a method of screening and prioritization, according to an exemplary embodiment of the present invention. The method begins when a caller places a call to a callee S331. Notification logic on the callee's communications device intercepts the call S332. The notification logic prompts the caller to choose whether or not to record a message S333. If the caller chooses to record a message, then the user records a short message S334. The caller is then prompted to select a priority for the call S335 based upon given options. This priority may be low, medium, high, etc. If the caller chooses not to record a message, then the caller is still prompted to select a priority of the call S335. Once the priority of the call is chosen, the notification logic on the callee's communications device determines whether the priority is acceptable S336. The acceptable priority is based upon predetermined settings, either by the callee or by default. If the priority is acceptable, then the recorded message is played over the ringtone of the callee's communications device S339. If the priority is not acceptable, then the callee's communications device saves the message to a memory S337. The call at that point may also be sent straight to voicemail, dropped, etc. The callee is alerted that there has been a missed call of a priority lower than the acceptable level S338.

Exemplary embodiments of the method of screening and prioritization follow similar steps even when the screening and prioritization takes place on a notification server. In some embodiments the notification server has control over the ringtone of the callee's communications device. In embodiments where the notification server does not have control over the ringtone of the callee's communications device, the callee's communications device rings normally after the caller has input the priority and context. Once answered the callee immediately hears the context of the call and is prompted to answer the call or not. In other embodiments where the notification server does not have control over the ringtone of the callee's communications device, the notification server sends a text message with the context prior to ringing. The text message can be a direct input from the caller or a voice message converted to text by the notification server using voice-to-text software.

In other exemplary embodiments, the priority is not selected by the caller, but is predetermined by the callee according to the caller. The callee's communications device uses the contacts list to input a priority for each contact. This can be the only priority relevant or can work in conjunction with a caller's input priority to form an ultimate priority before reaching the callee. Exemplary embodiments allow for specific and lengthy queries instead of a simple context query. A caller can be asked many questions and prompted for many responses before releasing the call to the callee. A series of YES/NO questions can be asked of the caller and each response a touch of a key on the caller's communications device. Based on the answers, a text message is created and displayed on the callee's communications device for review while the callee decides whether or not to answer the call.

Whether the screening and prioritization takes place on a notification server or the callee's communications device, a setup program can be used by the callee to set the preferences. A setup program is standard on communications devices with onboard screening and prioritization. However, even communications devices that rely on a notification server for screening and prioritization can benefit from a setup program. For these communications devices, the setup program communicates with the notification server each time the preferences are updated.

Figure 4:
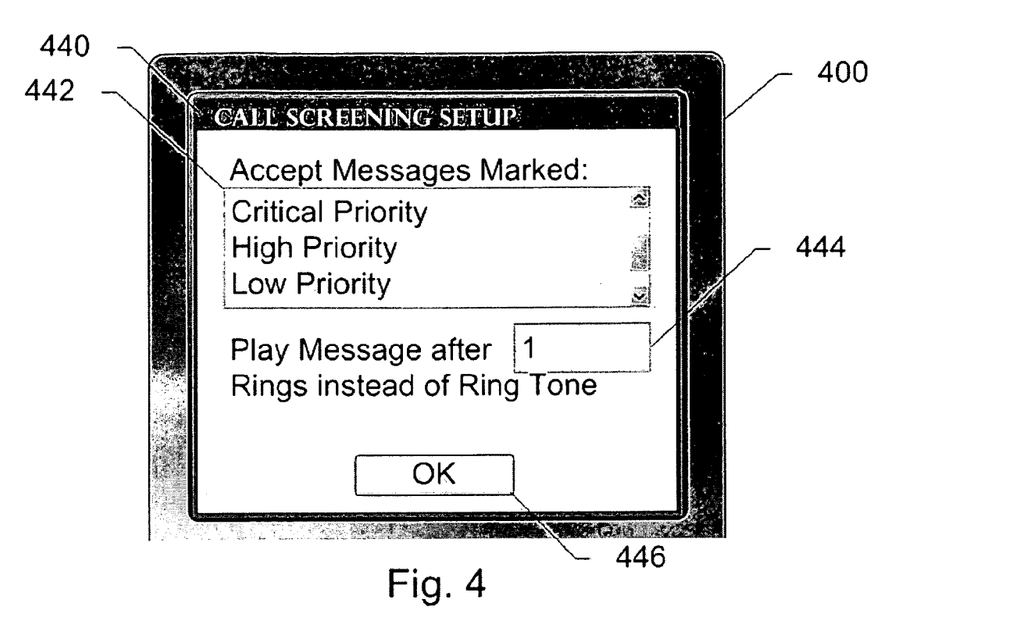
FIG. 4 shows a call screening setup screen on a communications device, according to an exemplary embodiment of the present invention.

FIG. 4 shows a call screening setup screen 440 on a communications device 400, according to an exemplary embodiment of the present invention. Notification logic onboard communications device 400 allows a callee to set preferences for incoming calls using call screening setup screen 440. In this embodiment, call screening setup screen 440 includes a priority level 442, a ringing option 444, and a confirmation button 446. A callee sets the level of priority of calls he wishes to receive by selecting a minimum priority on priority level 442. The callee selects the desired playout of a caller's call context on ringing option 444. In this embodiment, ringing option 444 allows the callee to select the number of normal rings of communication device 400's ringtone that will occur before the call context is played. With options selected, the callee presses confirmation button 446 to record the preferences into a memory on communications device 400 for use by the notification logic.

Other exemplary embodiments feature more elaborate setup options. One of these options is to set a different ringtone for each priority level. The ringtone or vibration pattern may be selected for the event where a call is ignored but a context has been saved. If the callee desires more specific call context, there are exemplary embodiments which allow the callee to input a series of YES/NO questions. Further embodiments allow the callee to input a series of questions with each question allowing the caller to record an answer.

In embodiments of the present invention, a caller may also have software on their communications device for setting a call priority and recording a message. In these embodiments the call is transmitted with information that legacy communications devices ignore, but to which a notification server or communications device having screening and prioritization software reacts.

Figure 5:
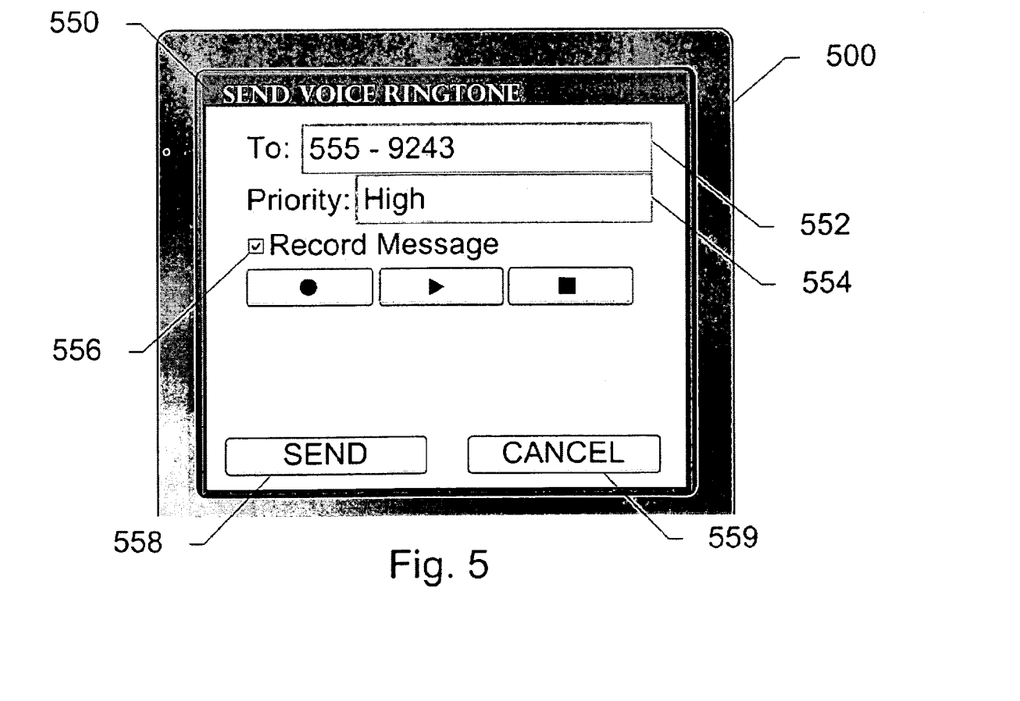
FIG. 5 shows a call notification screen on a communications device, according to an exemplary embodiment of the present invention.

FIG. 5 shows a call notification screen 550 on a communications device 500, according to an exemplary embodiment of the present invention. In this embodiment, call notification screen 550 includes a contact selection 552, a priority setting 554, a message recording option 556, a send button 558, and a cancel button 559. The caller selects a number of a contact to whom he wishes to talk in contact selection 552. The caller sets a priority of the call in priority setting 554. This is accomplished by scrolling to the appropriate priority and selecting that priority. The caller then selects whether or not to record a message by checking a box for message recording option 556. With the box checked, the caller presses a record button to record a message, and then a stop button to stop the recording. The caller may playback the recording to confirm the recording is what the caller desires. The caller activates send button 558 to place the call or cancel button 559 to cancel the call.

In other exemplary embodiments of a call notification screen, more options are present. A caller may have the option to record a voice message or type a text message. The caller may not have the desire to talk to the callee immediately but at some point when the callee is free. In these embodiments the caller can elect to simply send the context to the callee's communications device as if the priority does not meet the callee's current threshold.

In these embodiments where the caller has software assisting the screening and prioritization in addition to the callee's communications device or notification server, the process is slightly different. The caller inputs the priority and context before the call is initiated.

Figure 6:
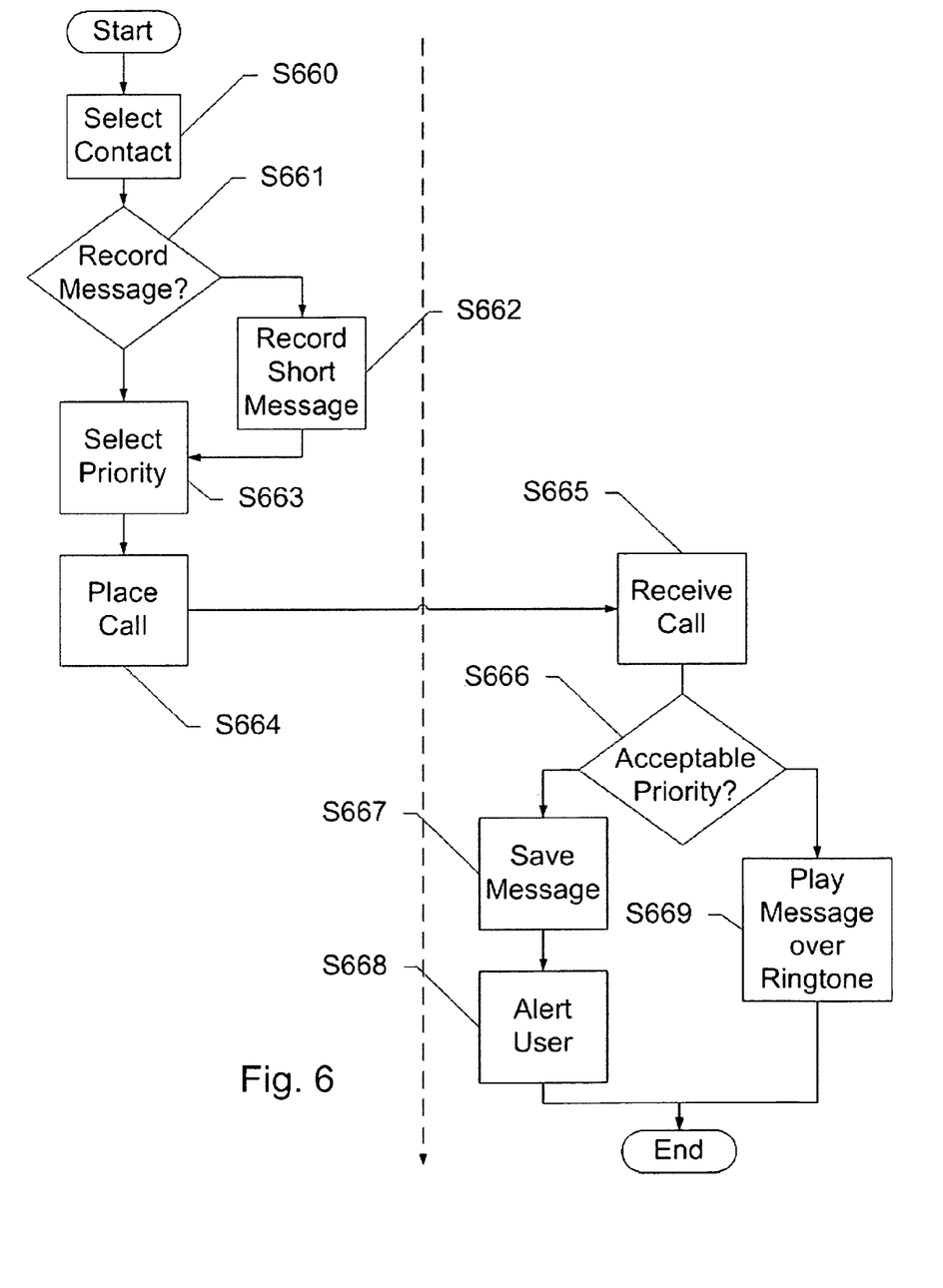
FIG. 6 shows a flowchart of a method of screening and prioritization in which the caller's communications device contains notification assistance logic, according to an exemplary embodiment of the present invention.

FIG. 6 shows a flowchart of a method of priority and context notification in which the caller's communications device contains notification assistance logic, according to an exemplary embodiment of the present invention. In this embodiment, the method begins by a caller selecting a contact he desires to call S660. Notification assistance logic onboard caller's communications device allows the caller to select whether or not to record a message to be played by callee's communications device S661. If the caller elects to record a message, the caller records a short message S662. The caller selects a priority for the call from a list of options S663. If the caller decides not to record a message, the caller selects the priority of the call S663. With at least the priority of the call set, the caller places the call S664. The call is received by callee's communications device S665. Notification logic on callee's communications device determines whether the call meets at least the minimum level of priority the callee has set the communications device to accept S666. If the call meets the acceptable priority level, then the recorded message is played over the callee's communications device's ringtone as the priority level is displayed along with caller's information S669. If the caller did not record a message, then the normal ringtone is played while the priority level is displayed along with caller's information. If the call does not meet the acceptable priority threshold, then the recorded message is saved to the callee's communications device S667. The callee is alerted that a call has been missed due to its lower priority S668.

The caller may not have the desire to talk to the callee immediately but at some point when the callee is free. In these embodiments the caller can elect to simply send the context to the callee's communications device as if the priority does not meet the callee's current threshold.

In emergency situations, exemplary embodiments are adapted to alert a callee of an emergency. Varying levels of danger are used to determine whether or not the callee should be notified immediately, or save the notification for later review. A tornado or flood watch may warrant only a medium priority and is subject to the callee's current priority. In other events such as an evacuation or hurricane, a warning message plays over the ringtone of the callee's communications device no matter what the current priority level is.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
a processor; and
a memory in communication with the processor, the memory storing computer-readable instructions that are executed by the processor to perform operations comprising:
receiving a selection of a device priority of a callee's device, the device priority being one of a low priority mode, a high priority mode, and a critical priority mode;
comparing a call priority of an incoming call with the device priority of the callee's device, wherein the incoming call comprises a recorded context of the call, the recorded context being a short phrase input at a caller's device; and
upon determining that the call priority of the incoming call is lower than the device priority of the callee's device, extracting the recorded context of the call, storing the recorded context and the call priority on the memory, and ignoring the call;
wherein a prompt is presented at the caller's device upon an initiation of the incoming call, the prompt being for selecting the call priority of the incoming call and to record the context of the incoming call.

2. The device in claim 1, wherein the callee's device is a cellular telephone.

3. The device in claim 1, further comprising a transceiver, the transceiver communicating via at least one of a cellular radio frequency, a voice over internet protocol, or a plain old telephone service.

4. The device in claim 1, further comprising a speaker.

5. The device in claim 1, further comprising a liquid crystal display.

6. The device in claim 1, further comprising an input in communication with the processor.

7. The device in claim 6, wherein the input is a touch screen.

8. A system comprising:
a callee's device in communication with a notification server, the callee's device comprising a processor; and
a memory in communication with the processor, the memory storing computer-readable instructions that are executed by the processor to perform operations comprising:

receiving a selection of a device priority of the callee's device, the device priority being one of a low priority mode, a high priority mode, and a critical priority mode;

comparing a call priority of an incoming call with the device priority of the callee's device, wherein the incoming call comprises a recorded context of the call, the recorded context being a short phrase input at a caller's device; and upon determining that the call priority of the incoming call is lower than the device priority of the callee's device, extracting the recorded context of the call, storing the recorded context and the call priority on the memory, and ignoring the call;

wherein the notification server provides a prompt at the caller's device for setting the call priority and to record the context of the incoming call.

9. The system in claim 8, wherein the incoming call is originated from at least one of a cellular telephone, a landline telephone, a personal digital assistant, or a computer.

10. The system in claim 8, wherein the device is one of a cellular telephone, a landline telephone, a personal digital assistant, or a computer.

11. The system in claim 8, wherein the notification server is in communication with a messaging service center, a public switched telephone network, and a wide area network.

12. The system in claim 8, wherein the notification server communicates the call priority of the incoming call and the recorded context of the incoming call to the callee's device via a broadcast tower.

13. The system in claim 8, wherein the notification server has a preferences logic for setting notification preferences using a legacy communications device.

14. The system in claim 8, wherein the caller's device contains a notification assistance logic, the notification assistance logic enabling the caller's device to record a message in response to a recording request being inputted at the caller's device, the message to be played on the callee's device.

15. A method comprising:
receiving, at a callee's device comprising a processor, a selection of a device priority of the callee's device, the device priority being one of a low priority mode, a high priority mode, and a critical priority mode;

performing, at the callee's device, a comparison between a call priority of an incoming call and a device priority of the callee's device, wherein the incoming call comprises a recorded context of the call, the recorded context being a short phrase input at a caller's device; and upon determining that the call priority of the incoming call is lower than the device priority of the callee's device, extracting, at the callee's device, the recorded context of the call, storing the recorded context and the call priority, and ignoring the call;

wherein a prompt is presented at the caller's device upon an initiation of the incoming call, the prompt being for selecting the call priority of the incoming call and to record the context of the incoming call.

16. The method in claim 15, wherein the recorded context further comprises a text message.

17. A method comprising:
receiving, at a callee's device, an alert indicating that an incoming call is being ignored upon determining that a call priority of the incoming call falls below a device priority of the callee's device, the device priority of the callee's device being received via a user interface on the callee's device and being one of a low priority mode, a high priority mode, and a critical priority mode, the incoming call comprising a recorded context of the call, the recorded context being a short phrase input at a caller's device;

extracting and storing, at the callee's device, the recorded context of the call and the call priority; and ignoring the call;

wherein a prompt is presented at the caller's device upon an initiation of the incoming call, the prompt being for selecting the call priority of the incoming call and to record the context of the incoming call.

18. The method in claim 17, wherein the alert comprises one or more of an audible alert or a vibration.

19. The method in claim 17, wherein the alerting further comprises displaying the priority and a caller identification.

* * * * *